United States Patent

[11] 3,572,471

[72] Inventor Ghislain Antoine Jean-Marie Martelee
Lieges, Belgium
[21] Appl. No. 747,936
[22] Filed July 26, 1968
[45] Patented Mar. 30, 1971
[73] Assignee Cockerill-Ougree-Providence et Esperance-Longdoz en abrege "Cockerill,"
Seraing-lez-Liege, Belgium
[32] Priority Aug. 11, 1967
[33] Belgium
[31] 41,445

[54] TRANSPORT VEHICLE
13 Claims, 3 Drawing Figs.
[52] U.S. Cl. ................................................ 188/144,
188/39, 188/177, 188/180
[51] Int. Cl. ........................................ B61h 13/20
[50] Field of Search ........................................ 188/135,
140, 144, 177, 180, 39, 55, 63

[56] References Cited
UNITED STATES PATENTS
459,624 9/1891 Biedermann ................ 188/39
814,422 3/1906 Beatty ........................ 188/39
863,193 8/1907 Lockett ...................... 188/39
1,455,325 5/1923 Nobrega ...................... 188/144

Primary Examiner—Duane A. Reger
Attorney—Young & Thompson

ABSTRACT: In a transport vehicle having a rigid frame and rollers rolling on a track there is provided, an automatic speed controlling means comprising a gear wheel whose rotation is controlled by an oscillating element having two jaws spaced apart from one another and cooperating respectively and alternately with the teeth of said gear wheel which is mounted on a shaft having on at least one end a friction roller rolling on said track and which is carried by a rocking component adapted to rock in respect of said rigid frame on any downwardly sloping part of said track to engage said friction roller with said track so as to slow the speed of travel of said vehicle along said sloping part. Alternatively, friction brakes may be provided which are applied by rocking movement of a vehicle component on a downwardly sloping track portion.

Patented March 30, 1971

INVENTOR

GHISLAIN ANTOINE JEAN-MARIE
MARTELEE
BY Young & Thompson
ATTYS.

INVENTOR
GHISLAIN ANTOINE JEAN-MARIE
MARTELEE
By Young + Thompson
ATTYS.

TRANSPORT VEHICLE

This invention relates to a transport vehicle whose wheels or rollers follow a track.

In industry, and particularly in the metallurgical industry, it is known art to utilize, for transporting all kinds of products, vehicles provided with wheels or rollers rolling on a rolling track. When such tracks include inclines it is necessary to provide complicated braking means which frequently prove inadequate and result in loss of efficiency and accidents. Vehicles are also known which are suspended from a support and guiding element such as a rail or cable which is followed by follower rollers of the vehicle. The frame of these vehicles is generally provided with a hook from which the load to be transported is suspended. In particular, in some work, it is known to place loaded vehicles of this kind waiting, one behind the other, on parallel sloping rolling tracks, on which they are each retained by a retractable stop. In this way a store of vehicles is formed from which it is possible to allow vehicles to leave singly under the action of their own weight, according to production requirements, by retracting the stop of the leading vehicle in a file and then retracting, in succession, the stops of the other vehicles which each move forward one place. Such an arrangement is rather complicated, not only from the constructional viewpoint, but also as regards the control of the stops. Furthermore, in view of the fact that the distance between two successive vehicles on the slope is considerable, each time a vehicle is released it picks up a quite considerable speed, so that shocks occur at the instant of arrest at each stop, and in addition there also take place at this moment undesirable oscillations of the loads, causing damage to the rollers and deterioration in the loads themselves as they strike each other. Also the high speeds developed by the vehicle on curved portions of the track lead to torques being induced in the loads which set up serious stresses on the rollers and which tend to push apart the support rails.

According to the invention there is provided a transport vehicle having rollers rolling on a track, having means for automatically controlling the speed of the vehicle when running on a slope comprising a wheel whose rotation is controlled by an oscillating element provided with two jaws spaced apart from one another and which cooperate respectively and alternately with the entrainment members of the said wheel which is mounted on a shaft having on at least one end a friction roller for engagement with the track and which is carried by a component which is adapted to rock in respect of the frame of the vehicle on any sloping part of the track to engage the friction roller with the track to retard the rate of travel of the vehicle along the track.

According to a feature of the invention the component which rocks in respect of the frame of the vehicle comprises a trolley having at least one roller on the rolling track and being extended in its upper portion by a fixed wing or extension carrying the gear and at least one friction roller on the said rolling track and by a wing or extension orientable transversely carrying at least one follower roller on the said track while the said trolley has a slot in which there moves a roller carried by an upright member of the frame of the vehicle.

The friction roller is arranged at the leading part of the trolley and a follower roller is arranged at the rear part of the trolley which itself also carries a follower roller. The two planes passing through the axes of these rollers make between them a dihedral angle slightly less than 180°. Furthermore, at its base the trolley has a guide slot directed parallel to the direction of movement of the vehicle in which is located a roller carried by an upright of the frame of the vehicle which, in one particular embodiment, is U-shaped, one arm forming the forward upright provided with a roller accommodated in the slot of the trolley while the other arm is the rear upright on which are fitted rollers rolling on the rolling track, which distribute the load over two zones, spaced quite widely apart, of the rolling track, thus reducing the lateral stresses arising from the torque produced by the loads as the vehicle travels around curves.

Specific embodiments of the invention will now be described by way of example with reference to the accompanying drawings, in which.

Figure 1:
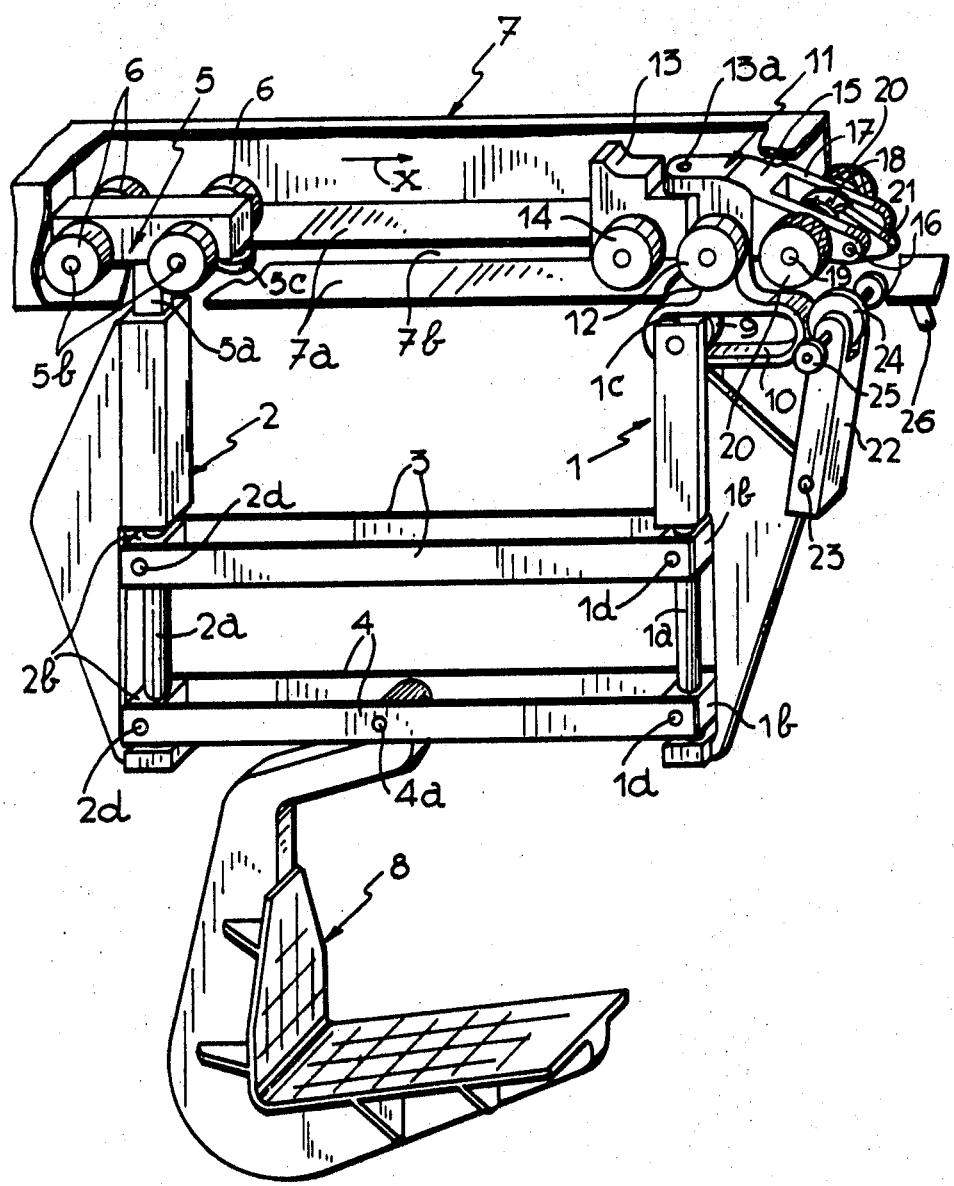
FIG. 1 is a diagrammatic view in perspective, of part of a vehicle in accordance with the invention.

The vehicle comprises a U-shaped or channel-type frame consisting of a vertical forward upright 1 and a vertical rear upright 2, each provided with a cylindrical bearing portion 1a and 2a respectively. Components 1b, 2b are pivoted on the said cylindrical bearing members. Side-frames formed by flat bars 3 and 4 are fixed to these pivoting components by pivots 1d and 2d, forming the base or web of the U-shaped member or channel. Due to the pivots 1d, 2d, there is formed with the uprights 1 and 2 and the side-frames 3 and 4 an assembly so articulated as to maintain the said uprights 1 and 2 constantly vertical whatever the slope of the rolling track. At the upper end of the rear upright 2 there is provided a tee bar 5 carrying shafts 5b, on which are mounted rollers 6 which are supported on the two lower flanges 7a of a rolling track 7 in the shape of an inverted trough. The vertical part 5a of the bar 5 passes freely through the longitudinal slot 7b between the two flanges 7a. Between the flat bars 4 of the lower side-frame is provided a pin 4a forming a pivot on which is suspended a hook 8 for the load to be transported. This hook 8 may be extended by a vertical bar also connected to the upper side members 3 by a pivot similar to 4a.

The forward upright 1 terminates at its upper part in a fork 1c carrying a roller 9 rolling in a slotted guide member 10 which is likewise accommodated in the fork 1c. This guide member 10 forms the foot of a trolley 11 whose vertical part travels in the longitudinal slot 7b and carries two rollers 12 rolling on the flanges 7a of the track these flanges being disposed on opposite sides of slot 7b.

In its upper portion the trolley 11 is provided rearwardly with a wing or extension 13 which is orientable transversely as it is free to rotate round a vertical pivot 13a. The advantage of this is that it permits the front of the vehicle to travel around curves of small radius without any lateral canting of the rollers, in a manner similar to that which occurs with the bogie of a railway car. The wing 13 carries two rollers 14 on opposite sides of wing 13 which, in the position represented, rest on the flanges 7a. Forwardly, the vertical part of the trolley 11 is extended at the upper part by a fixed member 15 terminating in a fork 17 that extends forwardly with respect to the direction of vehicle movement shown by the arrow X in FIG. 1, in which a pin gear 18 is mounted on a shaft 19 situated at a level above the plane passing through the axes of the shafts of the rollers 12 and 14. In this way, when the roller 9 is located in the rear part of the guide 10, as shown in the FIG., that is to say when the rolling track of the vehicle is horizontal or rising in relation to the direction of forward travel shown by the arrow X in FIG. 1, then the rollers 12 and 14 roll on the flanges 7a.

To the two ends of the shaft 19 and outside the fork 17 are fixed knurled rollers 20 of the same diameter as the rollers 12 and 14. When the roller 9 moves forward in the guide 10, that is to say when the vehicle is descending a slope, only the rollers 12 and the knurled rollers 20 roll on the flanges 7a, the rollers 14 then being raised, because the trolley 11 will have slightly tipped forwards in relation to the frame of the vehicle.

Figure 2:
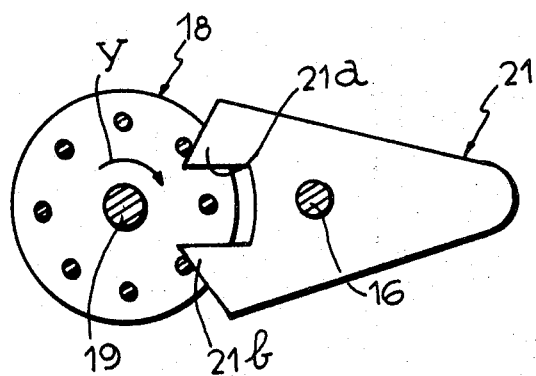
FIG. 2 is a diagrammatic detail view, in section, of a gear with pins and oscillating control element.

The rotation of the pin gear 18 as shown by the arrow Y in FIG. 2 is controlled by an oscillating element 21 mounted on a pivot 16 forward of the fork 17 and having two jaws 21a, 21b spaced apart from one another and one of which, being subjected to the thrust of a pin of the wheel 18 rocks the oscillating element 21 so as to bring the other jaw into the path of another pin of the wheel 18 which is thus alternately stopped and released. The system acts in the same manner as an anchor escape movement in clockwork mechanisms. Through this arrangement the pin gear 18 does not rotate freely but it thus undergoes a controlled rotation, so that the knurled rollers 20 also have their rotation controlled. The results is that when the vehicle descends a slope, the knurled rollers 20 prevent it from accelerating at an excessive rate.

To ensure adequate lateral guidance the vehicle rollers 5c, mounted on vertical spindles are provided, which run in the slot 7b and engage with the opposing edges of the flanges 7a. The spindles for these rollers 5c are mounted on the longitudinal arm of tee bar 5 and on members 13 and 15.

It will be noted that the axis of roller 12 lies in a vertical plane that transacts the slot of the guide member 10. Thus, when the roller 9 is in its position shown in FIG. 1, the rollers 12 and 14 are urged against the track 7 and the knurled rollers 20 are raised; but when the roller 9 is in the forward end of the slot of guide member 10, then the rollers 12 and 20 engage the track 7 and the rollers 14 are raised. Thus, the assembly of roller 9 and guide 10 provides in effect an overbalancing arrangement having two positions of equilibrium depending on the end of the slot in which the roller 9 is disposed. It is only in the forward position of the roller 9, when the vehicle is descending an inclined portion of track 7, that the roller 9 is in the forward end of the slot of guide 10 and the braking rollers 20 are in engagement with the track 7.

To ensure that on slight descending slopes the roller 9 of the forward upright 1 moves forwardly in the guide slot 10, there is provided an arm 22 pivoting at 23 in respect of the frame of the vehicle. The said arm carries a roller 24 supported on the upper end of arm 22 forward of the guide 10. The shaft of this roller 24 carries at its two ends rollers 25, which abut against fixed projections such as 26, on the underside of the track 7, which forces the arm 22 to swing counterclockwise, which in turn forces roller 24 rearwardly against the forward end of slot 10; and this in turn pushes the trolley 11 rearwardly relative to the rest of the vehicle and compels the roller 9 to move forward in the guide slot 10. When the vehicle moves forward, the lateral guides 25 are lowered upon the counterclockwise pivoting of the arm 22 and pass below the projections 26 on the track 7.

Figure 3:
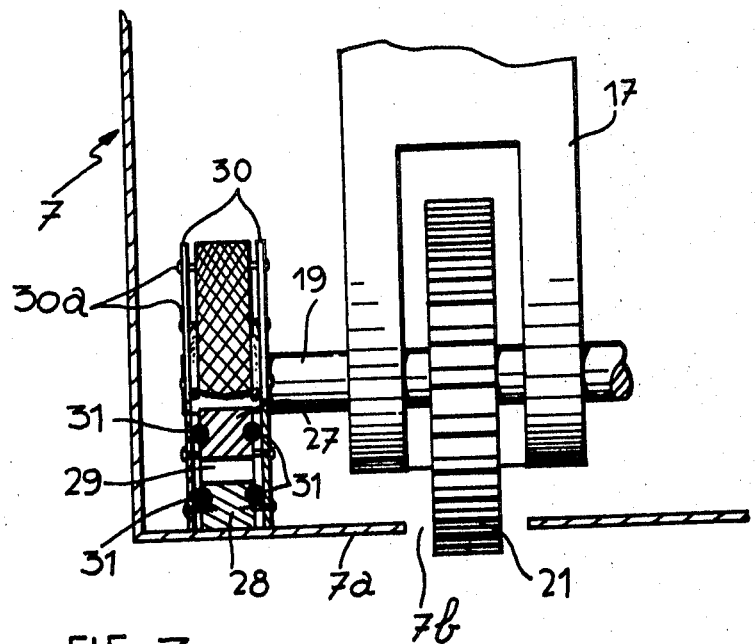
FIG. 3 is a diagrammatic detail view in front elevation and partly in section, of the oscillating element and a variant construction of the friction roller with an additional braking device.

The kinetic energy of the vehicle acquired before each stoppage by each jaw of the oscillating element 21 is absorbed by the friction of the knurled roller 20 on the track or, in an alternative embodiment, by friction in an additional braking device shown diagrammatically in FIG. 3, in which the same reference numerals as in FIGS. 1 and 2 are used for the same elements. In this case, in lieu of rollers 20, the braking device comprises a ring 27, keyed on each end of the shaft 19 on opposite sides of fork 17. On the said ring 27 a ring 28 knurled exteriorly, rolling on the flanges 7a of the track 7, rides with a very considerable clearance 29 in which there is lodged a material with a high coefficient of friction, such as sand for example or a strip of rubber. On the two faces of the knurled ring 28 are fixed two washers 30 by means of screws 30a, the leakage of the sand being prevented by annular joints 31.

Among the advantages of a vehicle such as that which has just been described, there must be mentioned in particular the possibility of controlling its speed on a slope by means of a simple and reliable device acting completely automatically without the intervention of any control arrangement and preventing the vehicle from picking up excessive speed.

The invention is not restricted to the vehicle described, and without going outside the scope of same it is possible to make various adaptations to it according to the purpose for which the vehicle is intended or the use being made of it. Thus, for instance, the lantern gear 18 may be replaced by an equivalent device having entrainment members such as a straight-toothed gear acting with an escapement mechanism.

I claim:

1. Transport vehicle having a rigid frame, comprising rollers on said vehicle, a track for said rollers, an automatic speed controlling means for controlling the speed of said vehicle, said speed controlling means being a gear wheel, an oscillating element, two jaws on said oscillating element spaced apart from one another and alternately engaging elements on said gear wheel, a shaft for mounting said gear wheel, a friction roller for engagement with said track on at least one end of said shaft, a rocking component carrying said shaft and which is adapted to rock in respect of said rigid frame on any downwardly sloping part of said track so as to engage said friction roller with said track to slow speed of travel of said vehicle along said downwardly sloping part.

2. Transport vehicle as claimed in claim 1, wherein said rocking component comprises a trolley having at least one roller and having in its upper part an extension orientable transversely to the frame of the vehicle and carrying at least one roller while the trolley has a guide slot member in which there moves a roller carried by the frame of the vehicle.

3. Transport vehicle as claimed in claim 2, wherein the roller of the orientable extension or wing and the friction roller are situated on either side of the trolley.

4. Transport vehicle as claimed in claim 3, in which a plane passing through the axis of the roller carried by said oriental extension and the axis of the roller carried by said oriental extension and the axis of the roller carried by the trolley and the plane passing through this latter axis and the axis of the friction roller form between them a dihedral angle slightly less than 180°, so that the friction roller is only supported on the rolling track when the vehicle is on a downward slope when the roller carried by the frame of the vehicle is brought forward of the vertical plane passing through the roller carried by the trolley.

5. Transport vehicle as claimed in claim 2, characterized in that the guide slot member of the trolley is situated below the rollers and disposed parallel to the direction of the rolling track.

6. Transport vehicle as claimed in claim 1, wherein the friction roller is situated towards the front of the vehicle in relation to the direction of forward travel.

7. Transport vehicle as claimed in claim 1, wherein the frame of the vehicle has, longitudinally, the from of a U or channel, whose two arms constitute two vertical uprights, rollers being fitted at the upper end of one upright while the other upright carries the roller moving in the guide slot of the trolley, and carries the said friction roller.

8. Transport vehicle as claimed in claim 7, wherein the two uprights of the frame of the vehicle are connected by side members fixed to components pivoting transversely on bearing members of the said uprights in such a way as to permit an alteration of the orientation of one upright in relation to the other upright.

9. Transport vehicle as claimed in claim 7, wherein the upright carrying the roller moving in the guide slot member of the trolley has an articulated arm supported on the outer face of the guide slot member by a roller carried by a shaft whose ends cooperate with a projection of the track so as to bring the roller of the upright of the vehicle forward in said guide slot.

10. Transport vehicle as claimed in claim 7, wherein the roller moving in the guide slot member of the trolley is mounted on the front upright of the frame of the vehicle in respect of the direction of forward travel.

11. Transport vehicle as claimed in claim 1, characterized in that the gear wheel is a pin gear.

12. Transport vehicle as claimed in claim 1, wherein the friction roller is a knurled roller fixed direct on the shaft of the wheel.

13. A transport vehicle having a frame, rollers carried by the frame, a track on which said rollers roll, said track including a downwardly inclined track portion, means for retarding the rotation of at least one of said rollers, means for selectively engaging said at least one roller with said track only when the vehicle is moving downwardly on said downwardly inclined track portion, said retarding means comprising a gear rotatable with said at least one roller, and oscillating escapement means having a pair of jaws alternately engageable with elements on said gear to retard the rotation of said at least one roller.